United States Patent
Chang et al.

(10) Patent No.: US 7,339,520 B2
(45) Date of Patent: Mar. 4, 2008

(54) PHASED ARRAY TERMINAL FOR EQUATORIAL SATELLITE CONSTELLATIONS

(75) Inventors: Donald C. D. Chang, Thousand Oaks, CA (US); William W. Mayfield, Torrance, CA (US); John I. Novak, III, West Hills, CA (US); Frank A. Taormina, El Segundo, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 180 days.

(21) Appl. No.: 09/497,865

(22) Filed: Feb. 4, 2000

(65) Prior Publication Data

US 2002/0050946 A1   May 2, 2002

(51) Int. Cl.
*H01Q 3/00* (2006.01)
(52) U.S. Cl. .................................. 342/359; 342/368
(58) Field of Classification Search ............. 342/359, 342/356, 367; 343/711, 767, 770, 757; 455/436, 455/437, 440, 442
See application file for complete search history.

(56) References Cited

U.S. PATENT DOCUMENTS

| | | | |
|---|---|---|---|
| 3,541,553 A | 11/1970 | Gubin | |
| 3,673,606 A | 6/1972 | Maune | |
| 3,720,953 A * | 3/1973 | Ajioka | ................. 343/771 |
| 4,635,063 A | 1/1987 | Chang et al. | |
| 4,799,065 A | 1/1989 | Thompson | |
| 4,812,788 A | 3/1989 | Wong et al. | ................. 333/113 |
| 4,926,186 A | 5/1990 | Kelly | |
| 4,979,170 A | 12/1990 | Gilhousen et al. | |
| 5,017,927 A | 5/1991 | Agrawal et al. | |
| 5,077,562 A * | 12/1991 | Chang et al. | ................. 342/368 |
| 5,081,464 A | 1/1992 | Renshaw | |
| 5,151,706 A | 9/1992 | Roederer et al. | |
| 5,218,619 A | 6/1993 | Dent | |
| 5,257,030 A * | 10/1993 | Aoki et al. | ................. 342/368 |
| 5,379,320 A | 1/1995 | Fernandes et al. | |
| 5,387,916 A | 2/1995 | Cohn | |
| 5,552,798 A | 9/1996 | Dietrich et al. | |
| 5,572,216 A | 11/1996 | Weinberg et al. | |
| 5,589,834 A | 12/1996 | Weinberg et al. | |
| 5,754,139 A | 5/1998 | Turcotte et al. | |
| 5,764,187 A | 6/1998 | Rudish et al. | |

(Continued)

FOREIGN PATENT DOCUMENTS

EP    0 190927 A    8/1986

(Continued)

OTHER PUBLICATIONS

Miura, Ryu, et al, "A DBF Self-Beam Steering Array Antenna for Mobile Satellite Applications Using Beam-Space Maximal Ratio Combination", IEEE, Trans. on Vehicular Tech., vol. 48, No. 3, May 1999, pp. 665-675.*

(Continued)

*Primary Examiner*—Gregory C Issing

(57) ABSTRACT

A low cost and low profile antenna for commercial use, either in a fixed or mobile condition is disclosed. The antenna has a generally flat circular plate that rotates to seam the azimuth direction. A plurality of radiation elements are positioned on the surface of the circular plate. The received signals are multiplexed, digitally converted, digitally beam-formed, and then transferred to a digital receiver.

21 Claims, 3 Drawing Sheets

U.S. PATENT DOCUMENTS

| | | | |
|---|---|---|---|
| 5,839,053 | A | 11/1998 | Bosch et al. |
| 5,856,804 | A | 1/1999 | Turcotte et al. |
| 5,903,549 | A | 5/1999 | Von der Embse et al. |
| 5,907,816 | A | 5/1999 | Newman et al. |
| 5,909,460 | A | 6/1999 | Dent |
| 5,917,447 | A | 6/1999 | Wang et al. |
| 5,973,647 | A * | 10/1999 | Barrett et al. ............ 343/713 |
| 5,982,337 | A | 11/1999 | Newman et al. |
| 5,990,928 | A | 11/1999 | Sklar et al. |
| 6,014,372 | A | 1/2000 | Kent et al. |
| 6,016,124 | A | 1/2000 | Lo et al. |
| 6,018,316 | A | 1/2000 | Rudish et al. |
| 6,020,845 | A | 2/2000 | Weinberg et al. |
| 6,061,562 | A | 5/2000 | Martin et al. |
| 6,111,542 | A * | 8/2000 | Day et al. ............... 342/359 |
| 6,147,658 | A * | 11/2000 | Higashi et al. .......... 343/853 |
| 6,151,308 | A | 11/2000 | Ibanez-Meier et al. |
| 6,151,496 | A * | 11/2000 | Richards et al. ......... 455/428 |
| 6,173,178 | B1 | 1/2001 | Hammill et al. |
| 6,204,822 | B1 | 3/2001 | Cardiasmenos et al. |
| 6,204,823 | B1 | 3/2001 | Spano et al. ............ 343/766 |
| 6,208,858 | B1 | 3/2001 | Antonio et al. |
| 6,259,415 | B1 | 7/2001 | Kumpfbeck et al. ...... 343/765 |
| 6,266,528 | B1 | 7/2001 | Farzaneh |
| 6,314,269 | B1 | 11/2001 | Hart et al. |
| 6,366,256 | B1 | 4/2002 | Ramanujam et al. |
| 6,380,893 | B1 | 4/2002 | Chang et al. |
| 6,388,615 | B1 | 5/2002 | Chang et al. |
| 6,388,634 | B1 | 5/2002 | Ramanujam et al. |
| 6,400,925 | B1 | 6/2002 | Tirabassi et al. |
| 6,414,646 | B2 | 7/2002 | Luh |
| 6,429,823 | B1 | 8/2002 | Bains et al. |
| 6,507,314 | B2 | 1/2003 | Chang et al. |
| 6,559,797 | B1 | 5/2003 | Chang |
| 2001/0048389 | A1 | 12/2001 | Nakagawa |
| 2002/0006795 | A1 | 1/2002 | Norin |
| 2002/0106041 | A1 | 8/2002 | Chang et al. |

FOREIGN PATENT DOCUMENTS

| | | |
|---|---|---|
| EP | 0 647976 A | 4/1995 |
| EP | 0 860 952 A | 8/1998 |
| EP | 0 961 416 A1 | 12/1999 |
| EP | 1 161 001 A2 | 12/2001 |
| GB | 2 349 045 | 10/2000 |
| JP | 2001345747 A | 12/2001 |
| WO | WO 9733342 A | 9/1994 |
| WO | WO 97/07609 A | 2/1997 |
| WO | WO 99/23769 | 5/1999 |

OTHER PUBLICATIONS

Sakakibara, Kunio et al, "A Two-Beam Slotted Waveguide Array for Mobile reception of Dual Polarization DBS", IEEE Trans. on Vehicular Technology, vol. 48, No. 1, Jan. 1999, pp. 1-7.*

Sato, Kazuo et al, "Development and Field Experiments of Phased Array Antenna for Land Vehicle Satellite Communications", IEEE Antennas and Propagation Society International Symposium, 1992, Jul. 1992, pp. 1073-1076.*

Suzuki, Ryutaro et al, "Mobile TDM/TDMA System with Active Array Antenna", Global Telecommunications Conf. 1991, Dec. 1991, pp. 1569-1573.*

Chiba, Isamu et al., "Digital Beam Forming (DBF) Antenna System for Mobile Communications", IEEE AES Systems Magazine, Sep. 1997, pp. 31-41.*

Chan, K. K., et. al, "A Circularly Polarized Waveguide Array for Leo Satellite Communications", Antennas and Propagation Society, 1999, IEEE International Symposium, vol. 1, Jul. 11-16, 1999, pp. 154-157.

Oodo, M., et. al, "Onboard DBF Antenna for Stratospheric Platform", 2000 IEEE International Conference on Phased Array Systems and Technology, Proceedings, May 21-25, 2000, pp. 125-128.

Yokosuka Research Park, "The First Stratospheric Platform Systems Workshop", May 12-13, 1999, pp. 1-216.

Agnew et al., "The AMSC Mobile Satellite System", Proceedings of the Mobile Satellite Conference, May 3-5, 1988, NASA JPL Publication 988-9, pp. 3-9.

Miura, Ryu et al.: "Beamforming Experiment With a DBF Multibeam Antenna in a Mobile Satellite Environment" IEEE Transactions on Antennas and Propagation, IEEE Inc. New York.

Kobayashi et al.; "Aperture Jitter Effects in Wideband ADC Systems"; IEEE Proceedings of ICECS 1999 Electronics, Circuits and Systems; Sep. 5-8, 1999, vol. 3, pp. 1705-1708.

Juodawlkis et al.; "Optically Sampled Analog-to-Digital Converters"; IEEE Transactions on Microwave Theory and Techniques; vol. 49, No. 10; Oct. 10, 2001.

* cited by examiner

PHASED ARRAY TERMINAL FOR EQUATORIAL SATELLITE CONSTELLATIONS

TECHNICAL FIELD

The present invention relates generally to a phased array antenna. More specifically, the present invention relates to a low cost, low profile tracking phased array antenna for use on a commercial satellite terminal for equatorial satellite constellation systems.

BACKGROUND OF THE PRESENT INVENTION

Current non-geostationary satellite technology directed towards the consumer market typically requires a tracking ground terminal. However, the tracking antennas with this current technology are expensive and bulky and, therefore, generally unacceptable to consumers. Current programs, including Ka-band and Ku-band programs require the development of a less costly, lower profile antenna.

These current conventional multi-beam tracking ground terminals, include arrays with mechanisms for steering beams, such as phase shifters and/or gimbles. These arrays further include integrated mechanisms for simultaneously tracking the pointing directions of multiple beams, such as monopulse tracking loops, step scan, and open loop pointing schemes. These conventional tracking phased arrays are too expensive for a consumer market, primarily because each beam must have a separate set of electronics associated with each element to process the various signals, including many phase shifters and many duplicate strings of electronics. Therefore, the manufacturing costs for these conventional tracking phased arrays are generally beyond that practical for the consumer market whether for use as a fixed antenna or by a user as a mobile antenna.

Additionally, current conventional tracking devices such as small tracking parabolic reflectors provide a possible solution for fixed users. For multiple beam terminals, multiple reflectors are required with each reflector tracking a specific beam. However, while operative, small tracking parabolic devices have an extremely high profile. To provide a conventional tracking phased array that could be constructed with an acceptable profile, would be prohibitive in cost. Further, these small tracking parabolic reflectors are not a viable alternative for a mobile user because of both their size and cost.

SUMMARY OF THE INVENTION

It is an object of the present invention to provide a low profile multiple beam tracking phased array antenna.

It is a further object of the present invention to provide a low profile tracking phased array antenna of a terminal that is for use on a commercial equatorial satellite constellation.

It is still another object of the present invention to provide a low profile tracking phased array antenna for use on either a fixed or mobile consumer commercial satellite terminal for equatorial satellite constellations.

It is still a further object of the present invention to provide a tracking phased array antenna that is suitable for use on a commercial satellite terminal for equatorial satellite constellations and is intended as a consumer product which provides high performance, is relatively inexpensive, and has a low profile.

It is yet another object of the present invention to provide a tracking phased array antenna with an integrated retrodirective mechanism.

It is yet a further object of the present invention to provide a low cost and low profile antenna that is mechanically scanned in azimuth and electrically scanned in elevation.

In accordance with the above and other objects of the present invention, a novel satellite antenna is provided. The antenna includes a rotating circular plate for scanning in the azimuth direction. A plurality of radiation elements are interdigitally spaced along the surface of the circular plate to electronically scan in elevation. In a receive mode, a plurality of individual waves are received at the radiation elements. The radiation elements will be rotated such that a wavefront of the intended signal will be in alignment with the major axis of the long elements. A multiplexer device within each element multiplexes the plurality of signals into a single analog signal before the signal is converted to a digital bit stream by an analog to digital computer. The digital bit stream is then passed to a device that transforms the digital bit streams into multiple digital beam forms. The multiple beam forms are then sent to a digital receiver for processing of the information from the signals. Further, a device is provided for digital multibeam forming through FFT techniques which provides retrodirectivity.

These and other features and advantages of the present invention will become apparent from the following description of the invention, when viewed in accordance with the accompanying drawings and appended claims.

BEST MODE(S) FOR CARRYING OUT THE INVENTION

Figure 1:
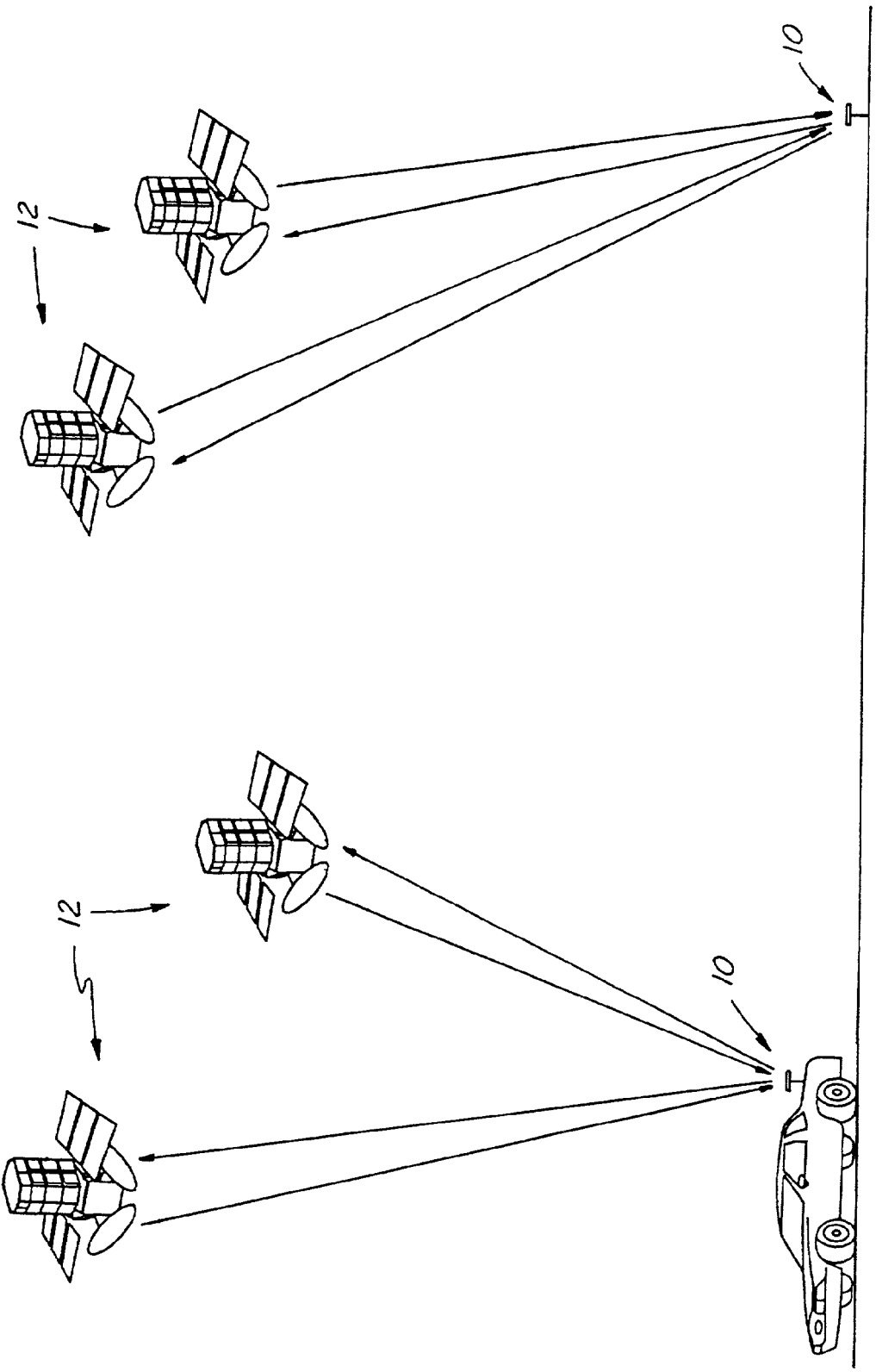
FIG. 1 is a perspective view of a satellite tracking system in accordance with a preferred embodiment of the present invention.

FIG. 1 illustrates an environmental view of the disclosed antenna in accordance with a preferred embodiment of the present invention. As shown, a preferred antenna 10 is positioned in a fixed position on the ground and is in communication with a plurality of orbiting satellites 12 to transmit signals thereto and receive signals therefrom. Another antenna 10 is attached to an automobile travelling along the ground which is also in communication with a plurality of orbiting satellites 12 to transmit signals thereto and receive signals therefrom. The disclosed antenna may also be attached to other mobile vehicles such as aircraft or boats. The satellites 12 are preferably medium earth orbit equatorial satellites.

Figure 2:
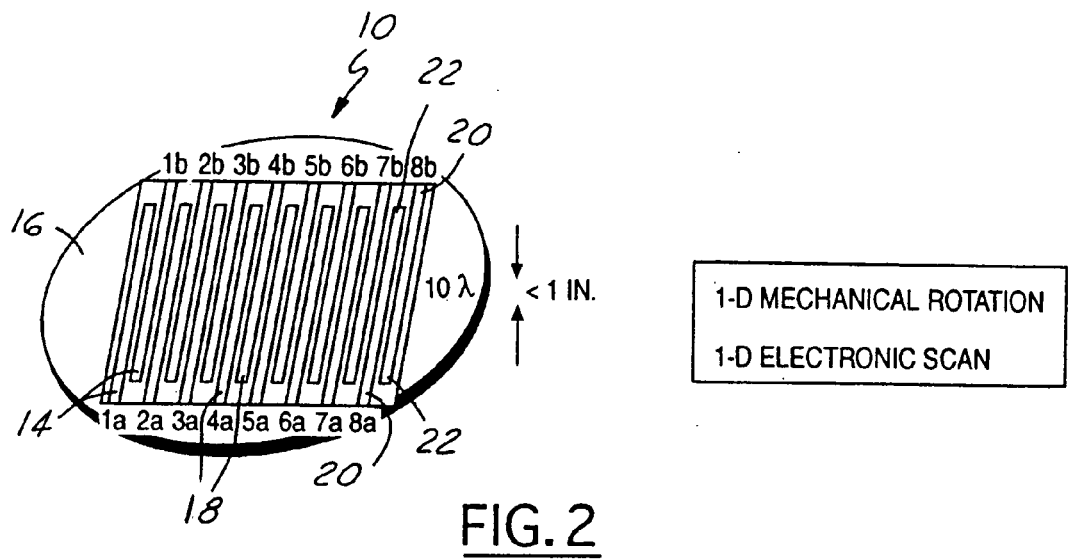
FIG. 2 is a perspective view of a rotating antenna configuration utilizing slotted waveguides in accordance with a preferred embodiment of the present invention.
Figure 3:
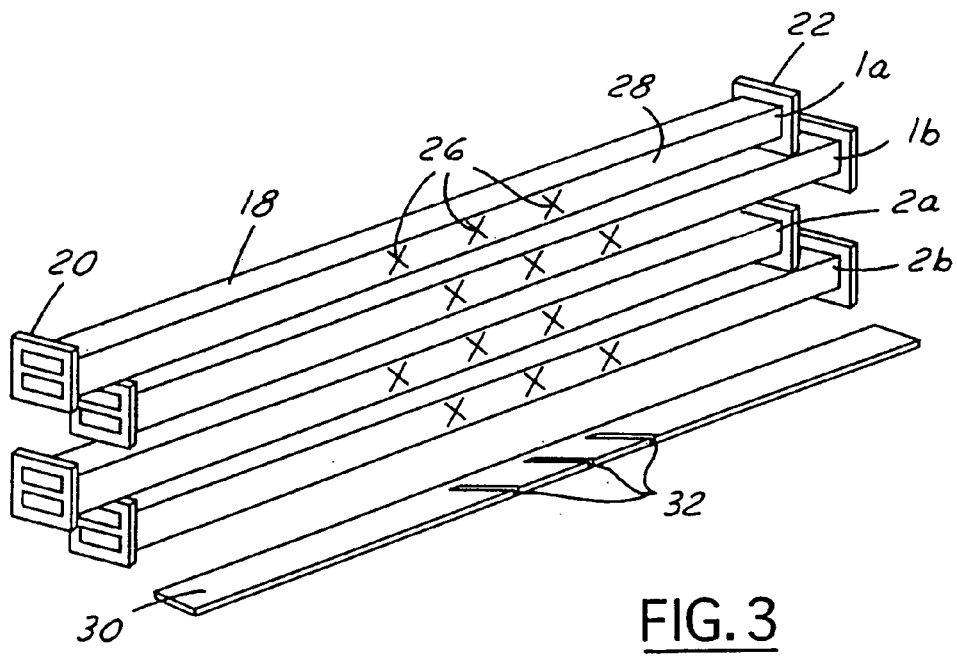
FIG. 3 is a perspective view of a plurality of cross-slotted waveguides for use on an antenna surface in accordance with a preferred embodiment of the present invention.
Figure 4:
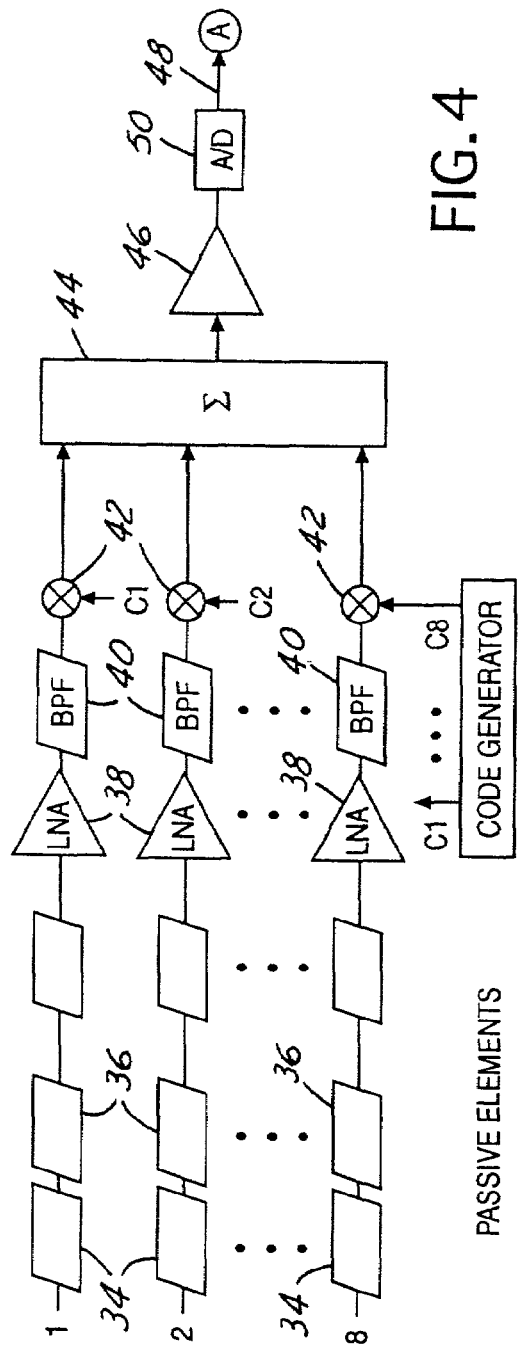
FIG. 4 is a schematic diagram of a circuit for intercepting the incoming wave and converting the wave signals to digital streams in accordance with a preferred embodiment of the present invention.

The preferred antenna 10 is illustrated in FIGS. 2 through 4 and provides a low cost and low profile configuration that also provides high performance. It should be understood that the illustrated antenna configuration is merely a preferred embodiment for achieving the objects of the present invention and that other configurations that provide low cost, low profile, and high performance may be utilized.

As shown in FIG. 2, the antenna 10 includes a plurality of antenna radiation elements 14 that are positioned on a circular plate 16. The circular plate 16 is a rotating plate that rotates about a center axis, as will be described further herein.

In a preferred embodiment, the rotating plate 16 is less than one inch (1") thick and has a diameter of fifteen inches (15") or less. Obviously, the dimensions of the rotating plate 16 may vary. However, the greater the diameter and thickness, the larger and more costly the antenna 10 will become. As shown in FIG. 3, the antenna radiation elements 14 are preferably constructed using a plurality of parallel slotted waveguides 18. However, a variety of different antenna radiation elements may instead be utilized, such as patch arrays. The operation of the disclosed antenna configuration is described in a receive mode only. The corresponding transmission mode operation can be easily understood by one of skill in the art via reciprocity.

In accordance with a preferred embodiment, each slotted waveguide element 18 is approximately 10 wavelengths long. In one embodiment, 16 long waveguide elements 18 are positioned on the circular plate 16. The waveguide elements 18 are grouped into two groups and are interlaced, as shown in FIG. 3, such that waveguide 1a and waveguide 1b begin at opposite ends of the circular plate 16 and overlap one another. Each of the individual waveguides are preferably separated by one-half wavelength (½ λ). Therefore, the total aperture in which the waveguide elements are positioned is about 10×10 wavelength in a square and the expected peak gain of a straight out or boresight beam from this aperture is about 28 to 30 dB. While the circular plate 16 rotates, rotating the antenna radiation elements 14 therewith, the vertical position of the circular plate 16 remains generally stationary. It should be understood that the number of waveguides positioned on the circular plate may vary, however, the preferred number of waveguide elements is between 10 and 20. Further, the distance between the waveguide elements and their length may also vary.

In a receive mode, the array antenna 10 will be rotated in the azimuth such that all slot array elements 18 will be in alignment with the planar wavefront of an intended incoming signal. Consequently, all the slots in a long waveguide element 18 are excited by the same planar wavefront simultaneously.

Each slotted waveguide element 18 has a first end 20 and a second end 22. The first ends 20 are positioned on a surface of the aperture 24 defining the radiation elements, while the second ends 22 are overlapped by adjacent slotted waveguide elements 18 such that the elements are interdigitally spaced. Each waveguide element 18 has a plurality of cross-slot openings 26 formed on their top surfaces 28. An H-plane septum (a metal plate) 30 is inserted into each waveguide element 18. Each metal plate 30 has a plurality of slanted slots 32 formed therethrough which act as one of the key circular polarization exciting mechanisms.

The waveguide elements 18 operate in a standing wave mode and have an identical fan-beam pattern with a 6° by 150° elliptical beam created through the cross-slot openings 26 on the top surfaces 28 of the waveguides 18. The cross-slotted waveguides 18 and the septum plate 30 are both illustrated in FIG. 3. The slanted slots 32 on the septum plate 30 are angled at approximately 45° and when positioned inside each waveguide element 18 will interact with the matching perpendicular cross-slots 26 on the top surface 28 (or E-plane) of the respective waveguide element 18. As a result, an incoming (right-hand) circular polarized wave on the E-plane wall will excite an $TE_{01}$ mode wave inside each waveguide element 18. To receive the opposite (left-hand) polarized wave, the slant angle of the slanted slots 32 on the septum 30 must change to approximately 135° or 45° in the opposite direction. In the preferred embodiment, on a given plate 16 some of the longitudinal elements 18 will have septums 30 with slanted slots 32 at approximately 45° and some of elements 18 will have septums 30 with slanted slots 32 at approximately 135°. It should be understood that a variety of other types of waveguide elements may be utilized so long as they allow for the formation of multiple beams.

In operation, the circular plate 16 will be rotated to a position such that the wave front of an intended incoming wave is parallel to the central axes of these slotted waveguide 18. The fan beam radiation pattern of each slotted waveguide element 18 will intercept the incoming wave individually, which will then be amplified, filtered, coded, multiplexed, and down converted. As shown in schematic FIG. 4, the conditioned signals will be converted to digital streams, which will then be decoded, digital beamformed, and then transferred to a digital receiver. A digital receiver will then convert the received waveform into information signals.

Specifically, as shown in FIG. 4, each of the pair of sixteen slotted waveguides 18, numbered 1 through 8 for purposes of illustration, will individually intercept an incoming wave. The waves will be intercepted by the phased array elements 18. The top portion of FIG. 4 is a schematic of a Ku band receive array. Similar architectures can be utilized for other frequency bands, such as L-band, S-band, and Ka band. Obviously, the present invention may be utilized for each of these frequency bands. As schematically represented by reference numerals 34, 36, the waves received at the waveguide elements 18 are processed by circuitry associated with each of the elements. The incoming wave is then amplified by a respective linear amplifier 38 before being passed to a conventional band pass filter 40 where the signal is filtered. After the signal has been filtered, it is then coded at a code generator 42 before being transferred to a multiplexer 44. The multiplexed signal is passed to an amplifier 46 before being multiplexed and then converted to a digital stream 48 by an analog-to-digital converter 50.

The code division multiplex technique illustrated in the top portion of FIG. 4, reduces the number of components in the down conversion chain as well as the number of analog-to-digital converters. The received signals from the waveguide elements 18 are multiplexed at the multiplexer 44 into a single microwave stream by known CDMA techniques, such as disclosed in U.S. Pat. No. 5,077,562. The multiplexing of the multiple signals reduces the number of components necessary to process the signals and consequently reduces the cost of the ground terminals. When operated in a noise dominant (via injection of orthogonal noise before analog to digital conversion), the receiver dynamic range can also be significantly enhanced through the oversampling of the analog to digital converter.

Incorporating these multiplexing techniques, as shown in FIG. 4, with known digital beam forming techniques provides improved receive performance in high dynamic range operation environments. It should be understood that conventional analog beam forming may be performed on the signals in accordance with the present invention. However, reducing the number of linear amplifiers 38 and phase shifter electronic sets from 360 elements to 16 elements for a receive antenna is a significant advantage and cost reduction provided by the present invention. The utilization of known digital beam-forming in accordance with the present invention provides further component and cost reductions.

The entire receiving antenna processing is performed through the combination of low profile one dimension radiation elements 14, which are placed in parallel on the circular rotating plate 16. The processing is further accompanied by aligning the long radiating elements 14 along the intended incoming waveform by rotating the circular plate 16 and then performing beam forming in the orthogonal direction by summing up the output signals of the long radiation elements. By processing the signals in this manner, a high performance antenna can be provided with a very low profile circular volume.

Figure 5:
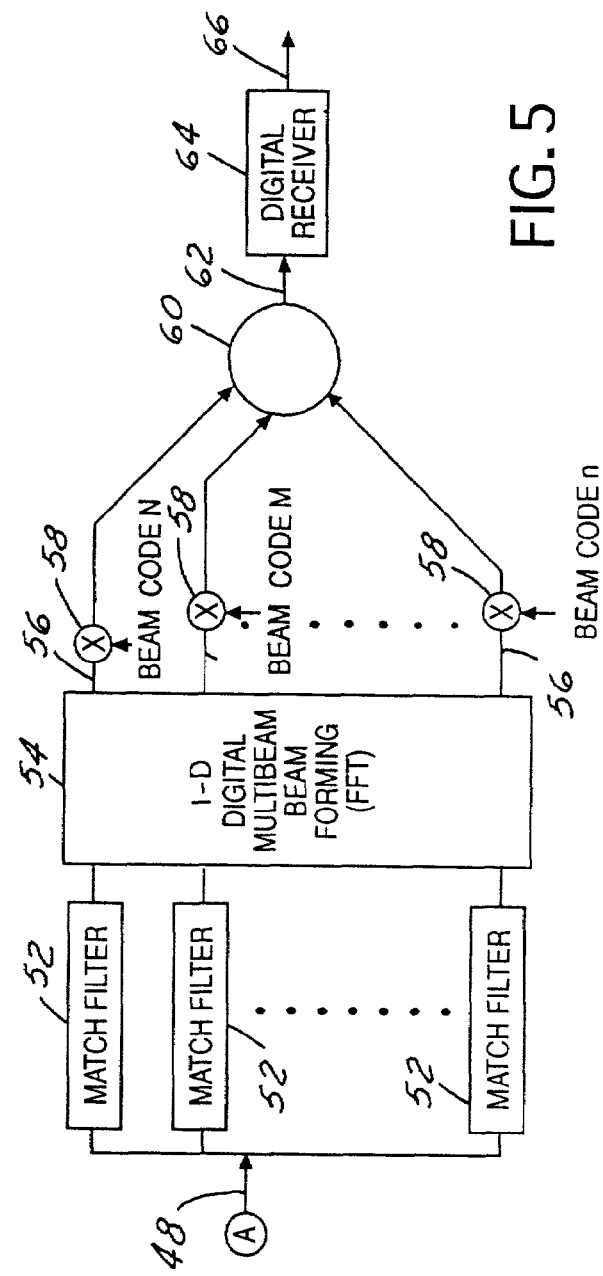
FIG. 5 is a schematic diagram of an integrated retrodirective tracking mechanism in accordance with a preferred embodiment of the present invention.

FIG. 5 illustrates a retrodirective mechanism that is integrated into the low profile antenna 10, described above, to eliminate the cost of conventional tracking mechanisms, in accordance with another preferred embodiment of the present invention. As shown in FIG. 5, the output of the analog-to-digital converter 48 is then input into a plurality of match filters 52, whose outputs are transferred to a digital multibeam beamforming device 54. The digital beams 56 are then transferred to a respective code generator 58 before being multiplexed at a multiplexer 60. The multiplexed beam 62 is then transferred to a digital receiver 64 where the received waveforms are converted into information signals 66.

Similar to the antenna disclosed in the prior figures, the entire receiving antenna and tracking processing of this preferred embodiment is through the low profile, one dimensional radiation elements 14. The radiation elements 14 are again preferably placed in parallel on the circular plate 16 which rotates about its center axis. The long radiation elements 16 are also aligned along the intended incoming waveform by the rotating circular plate 16 and then subjected to multiple beamforming, through fast fourier transforms (FFT) at the digital multibeam beamforming device 54. The outputs of the digital multibeam beamforming device 54 through FFT are associated with signals from various directions covered by the different (contiguous) beams. The outputs of the FFT will be fed into a retrodirective processing mechanism, as described below, to determine where the intended signal is coming from and then to send the transmit signal to the same direction. The low cost tracking is accomplished by retrodirectivity. The history of the beam positioning will be stored in the terminal as a reference for the satellite emphmeris.

The received signals are again multiplexed into a single microwave stream via known CDMA techniques to reduce the component counts and the ultimate cost of the ground terminals. Incorporating the unique multiple digital beam forming technique with multiplexing provides contiguous multiple receive beams. The receiver monitors the signals from all the multiple beams simultaneously. The outputs of the digital multiple beamformer are then indexed through a set of orthogonal codes, such as Hadamard code, each of which represents the unique beam direction. By identifying the code of the signals locked onto the receiver, the location where the signal is coming from has been identified as well as the corresponding phase slope of the received aperture.

The transmit signal will be directed to the same antenna beam position from where the received signal originated. The transmit beam can then be steered by a phase conjunction mechanism. This multibeam beamforming and phase conjugation mechanism using a Bulter matrix is described in U.S. Pat. No. 4,812,788. However, the present mechanism is incorporated in digital form through FFT and is therefore uniquely different from a Bulter matrix. The transmit beam utilizes the phasing information, to perform a phase conjugation across the array element, and digitally multiply the outgoing signals with the conjugated phasing (equivalently perform a DFT to the signals on the array aperture). All the retrodirective functions can be accomplished in a very low power and low cost consumer digital electronics.

During an acquisition phase (from a cold start), all the received beams will be on to cover the entire field of view of the fan beam (almost all the elevation at a given azimuth angle). The mechanical search volume will be reduced to a one-dimensional (azmuthal) direction. With some knowledge of where the new satellite may come into the field of view, one may decide to only turn on the receive beams through the incoming direction.

Once the satellite link is established, the tracking mechanism is similar to that of a step scan principle. The signal strengths from adjacent received beams will be monitored and used to compare with the one coming from the main beam, the beam with the strongest signal will be identified as the locked (main) beam. As a satellite moves through from horizon to horizon, a user terminal within the field of view (FOV) will switch the antenna to receive, and transmit beams from one position to another accordingly without conventional antenna tracking loops.

As for equatorial non-geosynchronous constellations, users can use the disclosed terminal to avoid interruption during handover. During transition, there will be one satellite coming in and another satellite going out from a user's FOV. Furthermore, there is only a limited time window when the satellites are at the same elevation or near the same elevation, but at a different azimuth angle. The disclosed antenna can form two beams pointed towards these two satellites simultaneously. Consequently, it can provide the capability of "connect before break" during the hand over phase.

This low profile antenna configuration with a low profile randome may look like a thick pizza, and can be mounted on top of a moving vehicle, such as an automobile or an aircraft. This configuration can also be used as fixed user or mobile terminals for low earth orbit satellite constellations at L, S, Ku, and Ka frequency bands.

Having now fully described the invention, it will be apparent to one of ordinary skill in the art that many changes and modifications can be made thereto without departing from the spirit or scope of the invention as set forth herein.

What is claimed is:

1. An antenna for communication with a satellite, the antenna being for use on a satellite terminal, comprising:
    a one-dimensionally rotating plate for mechanically rotating in a horizontal plane while maintaining a vertical position and scanning for wave signals in the azimuth direction;
    a plurality of radiation elements positioned on said rotating plate for one-dimensionally electronically scanning for wave signals in an elevation direction, said radiation elements forming respective element signals;
    first coding circuitry coupling a respective code to a respective one of the element signals to form respective coded element signals;
    a first multiplexer associated with said plurality of radiation elements for consolidating the coded element signals received at each of said plurality of radiation elements to an analog bit stream;

an analog to digital converter for converting said analog bit stream to a digital bit stream;

filter circuitry for forming multiple digital signals corresponding to respective coded element signals from said digital bit stream;

digital beam forming circuitry beam forming multiple digital beam signals from the multiple digital signals;

second coding circuitry coupling respective beam codes to each of the multiple digital beam signals to form a plurality of coded digital beam signals;

a second multiplexer consolidating the plurality of coded digital beam signals to form a signal stream; and a digital receiver determining signal strengths for the coded digital beam signals in the signal stream and determining a transmit direction by identifying one of the plurality of coded digital beam signals having a strongest signal having a corresponding element.

2. The antenna of claim 1, wherein said plurality of radiation elements are a plurality of parallel cross-slotted waveguides.

3. The antenna of claim 2, wherein each of said plurality of parallel cross-slotted waveguides includes a slotted septum therein.

4. The antenna of claim 1, wherein said circuitry for forming multiple digital beams does so through FFT techniques.

5. The antenna of claim 1, wherein said antenna may be utilized on a mobile vehicle.

6. An antenna for communication with an equatorial satellite constellation, comprising:

a one-dimensionally rotating plate for mechanically rotating in a horizontal plane while maintaining a vertical position and scanning for a wavefront of wave signals in an azimuth direction;

a plurality of radiation elements positioned on said rotating plate for one-dimensionally scanning in an elevation direction, receiving the wave signals and generating respective element signals in response thereto;

first coding circuitry coupling a respective code to a respective one of the element signals to form respective coded element signals;

apparatus for positioning said radiation elements such that the wavefront will be in alignment with a major axis of said plurality of radiation elements;

a first multiplexer device being in communication with each of said plurality of radiation elements for converting said plurality of coded element signals into an analog bit stream;

an analog to digital converter for converting said analog bit stream to a digital bit stream;

filter circuitry for forming multiple digital signals from said digital bit stream; and digital beam forming circuitry beam forming the multiple digital beam signals from the multiple digital signals;

second coding circuitry coupling respective beam codes to each of the multiple digital beam signals to form a plurality of coded digital beam signals;

a second multiplexer consolidating the plurality of coded digital beam signals to form a signal stream;

a digital receiver for processing said coded digital stream signals from said signal stream and determining a transmit direction by identifying one of the plurality of coded digital beam signals having a corresponding element with a strongest signal strength, said digital receiver determining a second beam corresponding to a second equatorial satellite in the constellation before handing over from a first equatorial satellite.

7. The antenna of claim 6, wherein said device for forming multiple digital beam forms utilizes an FFT technique to provide for retrodirectivity.

8. The antenna of claim 6, wherein said antenna transmits said multiple digital beams to a plurality of satellites in the equatorial satellite constellation.

9. The antenna of claim 7, wherein said plurality of radiation elements are a plurality of interdigitally spaced slotted wave guides.

10. The antenna of claim 6, wherein said rotating plate is generally circular in shape.

11. The antenna of claim 10, wherein each of said plurality of interdigitally spaced slotted waveguides includes a slotted septum therein.

12. A method for forming multiple beams at a satellite antenna comprising:

providing a plurality of radiation elements on one-dimensionally rotating plate for receiving a plurality of individual wave signals and forming respective element signals;

one-dimensionally rotating said plurality of radiation elements in an azimuth direction and one-dimensionally electronically scanning in an elevation direction so that a wavefront of said plurality of individual wave signals is in alignment with a major axis of said plurality of radiation elements;

coding the respective element signals to form coded element signals;

consolidating said plurality of coded element signals into an analog signal;

converting the analog signal to a digital signal;

forming multiple digital beam signals from said analog signal after match filtering and removing a code;

coupling respective beam codes to each of the multiple digital beam signals to form a plurality of coded digital beam signals;

consolidating the plurality of coded digital beam signals to form a signal stream;

determining signal strengths for the coded digital beam signals; and determining transmit direction by determining a strongest signal of the signal strengths and a corresponding element.

13. The method of claim 12, further comprising:

utilizing FFT techniques to form said multiple digital beam signals to provide for satellite retrodirectivity.

14. The method of claim 12, wherein said plurality of radiation elements are a plurality of cross-slotted waveguides.

15. The method of claim 14, wherein said plurality of cross-slotted waveguides are parallel and interdigitally spaced with respect to each other.

16. A phased array antenna for communication with an equatorial satellite constellation, comprising:

a rotating plate for electronically scanning for a wavefront of wave signals in an azimuth direction;

a plurality of elongated waveguide elements disposed in parallel on said rotating plate for one-dimensionally scanning in an elevation direction, receiving the wave signals and generating elements signals in response to the wave signals, each of said plurality of waveguide elements having a major axis and a minor axis;

apparatus for positioning said radiation elements such that the wavefront will be in alignment with the major axis of said plurality of radiation elements;

a first multiplexer device being in communication with each of said plurality of radiation elements for converting said plurality of coded element signals into an analog bit stream;

an analog to digital converter for converting said analog bit stream to a digital bit stream;

filter circuitry for forming multiple digital signals from said digital bit stream;

digital beam forming circuitry beam forming the multiple digital beam signals from the multiple digital signals;

second coding circuitry coupling respective beam codes to each of the multiple digital beam signals to form a plurality of coded digital beam signals;

a second multiplexer consolidating the plurality of coded digital beam signals to form a signal stream; and a digital receiver for processing said coded digital stream signals from said signal stream and determining a transmit direction by identifying one of the plurality of coded digital beam signals having a corresponding element with a strongest signal strength.

17. The antenna of claim 16, wherein each of said plurality of elongated waveguide elements is cross-slotted waveguides.

18. The antenna of claim 17, wherein each of said plurality of waveguide elements includes a slotted septum therein.

19. The antenna of claim 16, wherein the antenna is disposed on a mobile vehicle.

20. The antenna of claim 16, wherein the antenna is configured with a low profile.

21. The antenna of claim 16, wherein the antenna is in communication with a commercial satellite terminal.

* * * * *